United States Patent [19]

Berthold

[11] Patent Number: 5,010,770
[45] Date of Patent: Apr. 30, 1991

[54] VIBRATING TUBE FIBER OPTIC PRESSURE TRANSDUCER WITH LIGHT-POWERED ELECTRO-MAGNETIC DRIVE

[75] Inventor: John W. Berthold, Salem, Ohio
[73] Assignee: The Babcock & Wilcox Company, New Orleans, La.
[21] Appl. No.: 409,849
[22] Filed: Sep. 20, 1989
[51] Int. Cl.$^5$ .............................................. G01L 11/00
[52] U.S. Cl. ........................................ 73/702; 73/705; 73/862.59; 250/227.14; 250/231.19
[58] Field of Search ............... 73/702, 705, 862.58, 73/862.59; 250/231 P, 227.11, 227.14, 231.19; 356/345, 352

[56] References Cited

U.S. PATENT DOCUMENTS

| | | | |
|---|---|---|---|
| 4,020,696 | 5/1977 | Vrolyk | 73/412 |
| 4,048,846 | 9/1977 | Catherall | 73/67.2 |
| 4,084,439 | 4/1978 | Teter et al. | 73/718 |
| 4,147,977 | 4/1979 | Dimmick | 324/121 R |
| 4,265,251 | 5/1981 | Tickner | 128/660 |
| 4,515,473 | 5/1985 | Mermelstein | 73/705 |
| 4,531,416 | 7/1985 | Loewenstern et al. | 73/735 |
| 4,713,540 | 12/1987 | Gilby et al. | 250/231 P |
| 4,743,752 | 5/1988 | Olsen et al. | 250/231 P |
| 4,772,786 | 9/1988 | Langdon | 250/231 P |
| 4,778,987 | 10/1988 | Saaski et al. | 250/231 P |
| 4,853,534 | 8/1989 | Dakin | 250/231 P |

OTHER PUBLICATIONS

C. A. Wade and A. Dandridge, "An Optical Fiber Flowmeter Based on the Coriolis Effect," SPIE Proc. No. 985, p. 299, 1988.

Primary Examiner—Joseph A. Orsino
Assistant Examiner—Brent A. Swarthout
Attorney, Agent, or Firm—Vytas R. Matas; Robert J. Edwards; Daniel S. Kalka

[57] ABSTRACT

A fiber optic transducer system to measure the pressure within a vibrating tube is disclosed. Light pulses produced by a laser diode are transmitted through an optical fiber to a photo diode which converts same into current pulses which are, in turn, converted into magnetic pulses by an electromagnet. A permanent magnet attached to the vibrating tube is caused to vibrate in response to the magnetic pulses applied thereto. A mirror attached to the vibrating tube intercepts continuous light transmitted by a second optical fiber and reflects same to a detector which measures displacement of the mirror via intensity modulation or phase differences between the transmitted light and the reflected light.

11 Claims, 2 Drawing Sheets

VIBRATING TUBE FIBER OPTIC PRESSURE TRANSDUCER WITH LIGHT-POWERED ELECTRO-MAGNETIC DRIVE

TECHNICAL FIELD

The present invention relates, in general, to a device for measuring a process parameter and, more particularly, to a fiber optic transducer utilizing a light powered electromagnetic drive to measure the pressure within a vibrating tube.

BACKGROUND ART

In industrial applications where process parameters, such as pressure or flow, must be measured, excellent dc stability of the sensors and associated transducers is required in order to obtain accurate measurements. Because of this, the transducer utilized must exhibit extremely low output drift.

Fiber optic sensors and transducers have been used in industrial measurement applications, such as pressure measurement. It has been found that fiber optic sensors that measure changes in light intensity have better dc stability than sensors that measure changes in light phase or polarization. Fiber optic sensors that measure light intensity, however, have other operating characteristics which offset the foregoing better dc stability. For example, use of intensity sensors typically results in inherent measurement errors caused by cable and sensor lead bending and connector coupling loss. Because of this, some types of fiber optic sensors cannot be used in applications where low output drift is required while other types of fiber optic sensors require the utilization of techniques to compensate for changes in parameters other than the parameter being measured. Such compensation techniques typically increase system complexity and cost.

Because of the foregoing problems associated with the prior art apparatus and methods for measuring process parameters by utilizing fiber optic sensors, it has become desirable to develop a system and method for producing very accurate measurements of process parameters, such as pressure, in industrial applications.

SUMMARY OF THE INVENTION

The present invention solves the problems associated with the prior art and other problems by providing a fiber optic transducer system having a light powered electromagnetic drive to measure various process parameters, such as pressure, of a vibrating tube. The transducer system includes a laser diode which produces light pulses that are transmitted through an optical fiber to a photodiode which converts the light pulses into current pulses which are, in turn, converted into magnetic pulses by an electromagnet. A permanent magnet is attached to the vibrating tube and converts the periodic force from the magnetic pulses into periodic mechanical vibration of the tube. A mirror is placed on the surface of the tube adjacent the end of an optical fiber displacement sensor. A continuous light signal is transmitted by the optical fiber associated with the displacement sensor and directed toward the mirror from which the light is reflected and subsequently intercepted in order to transform the periodic displacement of the tube into a light signal modulated in both intensity and phase. Determination of the frequency of intensity modulation or the phase difference between the reflected light signal and a reference light signal, and comparison of same against a calibration table provides an accurate indication of the pressure within the vibrating tube.

DESCRIPTION OF THE PREFERRED EMBODIMENT

Figure 1:
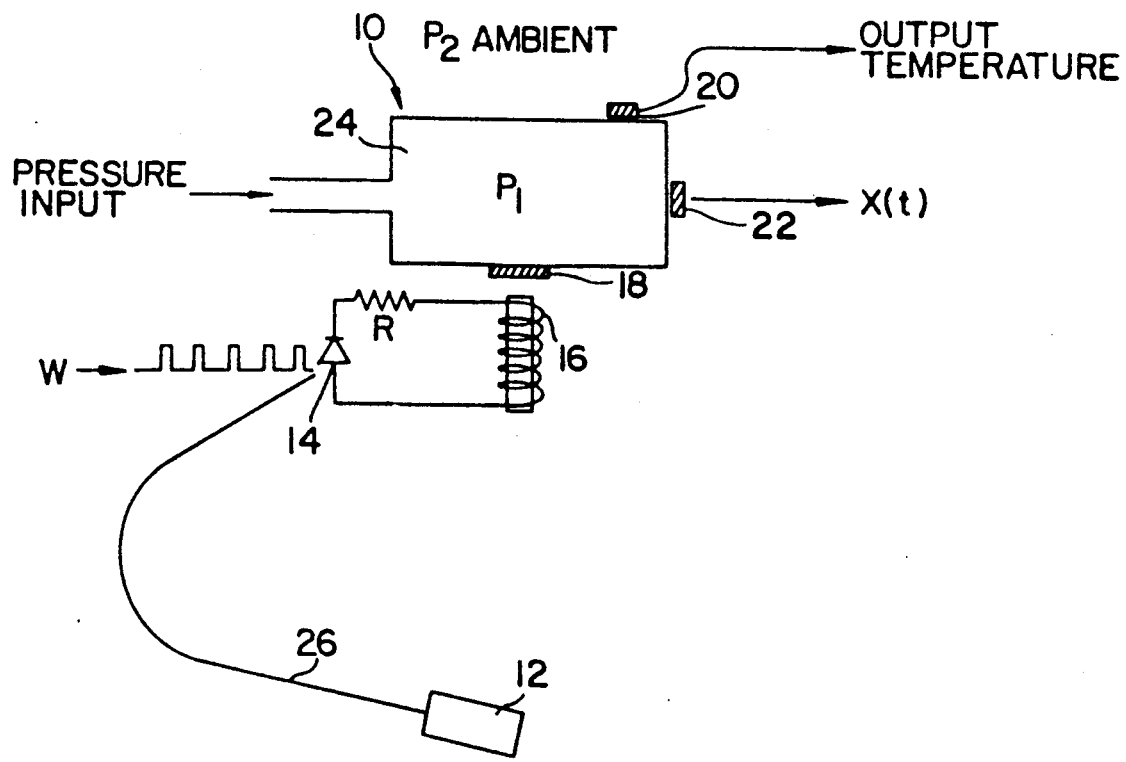
FIG. 1 is a schematic diagram of the present invention.

Referring now to the drawings where the illustrations are for the purpose of describing the preferred embodiment of the present invention and are not intended to limit the invention hereto, FIG. 1 is a schematic diagram of the pressure sensing system 10 of the present invention. The system 10 is comprised of a laser diode 12, a photodiode 14, an electromagnet 16, a permanent magnet 18, and a plurality of sensors 20, 22 which respectively monitor temperature and pressure variations within a vibrating tube 24. Operationally, the laser diode 12 is pulsed at a frequency $\omega$, and the pulses are transmitted through an optic fiber 26 to the photodiode 14 which converts the light pulses into current pulses. The current pulses are, in turn, converted into magnetic pulses by the electromagnet 16. The permanent magnet 18 attached to the vibrating tube 24 experiences a periodic force from the magnetic pulses and this force is converted into periodic mechanical vibration of the tube 24 at the foregoing frequency $\omega$. The displacement sensor 22 converts the periodic displacement of the vibrating tube 24 into a modulated light signal whose intensity or phase modulation frequency can be measured very accurately using signal processing techniques based on frequency counting.

The laser diode 12 may be any one of several commercially available devices. For example, a GaAlAs based laser diode operating at a nominal 820 nm wavelength and providing output powers up to 0.2 watts can be utilized. A pulse rate of approximately 50 Hz and a 50 percent duty cycle can be employed. The pulses are transmitted via optical fiber 26 to photodiode 14 which can be a silicon solar diode array which can convert the light pulses into a pulsed current of 50 to 100 ma depending upon fiber coupling and connector losses. With respect to the electromagnet 16, this device can be designed to have a pulling/pushing force of approximately 5 lbs. If the vibrating tube 24 has a spring rate of less than 5,000 lbs./in., then a 5 lb. force would produce at least 0.001 in. deflections which are of sufficient magnitude to be measured by the sensor 22. Such an electromagnet 16 can be built using a purified iron pole piece having a diameter of 0.5 inches and a length of 1 in. with a relative permeability of 10,000. Approximately 680 turns of No. 26 B&S gauge copper wire wound onto the pole piece can provide the proper magnetic flux to achieve the desired pulling force at a current of 100 ma which is available from the laser diode 12 in conjunction with the photo diode 14.

The vibrating tube 24 is designed to have a mechanical resonant frequency, $\omega_p$, which changes in proportion to the pressure within the tube 24. Dependence of $\omega_p$ with respect to pressure is required in order to provide the maximum change for the best pressure sensitivity while at the same time minimizing the sensitivity of the tube 24 to external vibrations. The resonant frequency $\omega_r$ of the tube 24 as a function of pressure is given by the following equation:

$$\omega_r = (\omega_p^2 - 2\beta^2)^{\frac{1}{2}} \tag{1}$$

where $\beta$ is the damping coefficient which is kept less than $\omega_p/2$.

As previously indicated, the laser diode 12 is pulsed at a frequency $\omega$ and the pulses are transmitted through optical fiber 26 to the photodiode 14 which converts the light pulses into current pulses which are, in turn, converted into magnetic pulses by the electromagnet 16. The permanent magnet 18 attached to the tube 24, in turn, experiences a periodic force from the magnetic pulses and this force is converted into periodic mechanical vibration of the tube 24 at the foregoing frequency $\omega$. The sensor 22 converts the periodic displacement $x(t)$ of the vibrating tube 24 given by the following equation into a modulated light signal:

$$X(t) = \frac{A\cos(\omega t - \delta)}{[(\omega_p^2 - \omega^2)^2 + 4\omega^2\beta^2]^{\frac{1}{2}}} \tag{2}$$

where $\delta$ represents the phase difference between the foregoing frequency $\omega$ and the frequency of the vibrating tube.

The resonant frequency, $\omega_r$, of the tube 24 is dependent upon the pressure within the tube and can be determined from Equation 1. Measurement of the maximum value for the periodic displacement $x(t)$ of the tube as the frequency $\omega$ is swept permits the mechanical resonant frequency of the tube, $\omega_p$, and thus, the resonant frequency, $\omega_r$, to be determined. From Equation 2, it can be determined that the maximum value of the periodic displacement $x(t)$ occurs when the frequency $\omega$ of the laser diode, is equal to the mechanical resonant frequency of the tube, $\omega_p$, and when $\beta$ is constant.

The pressure within the tube 24 can be determined from a calibration table of mechanical resonant frequency $\omega_p$ versus pressure. Temperature dependent changes in the resonant frequency $\omega_r$ may be compensated by measuring temperature using sensor 20. Alternatively, it may be possible to adjust the damping coefficient, $\beta$, so as to have one-half the temperature dependence of the mechanical resonant frequency of the tube $\omega_p$ so that this temperature dependence cancels in Equation 1.

Figure 2:
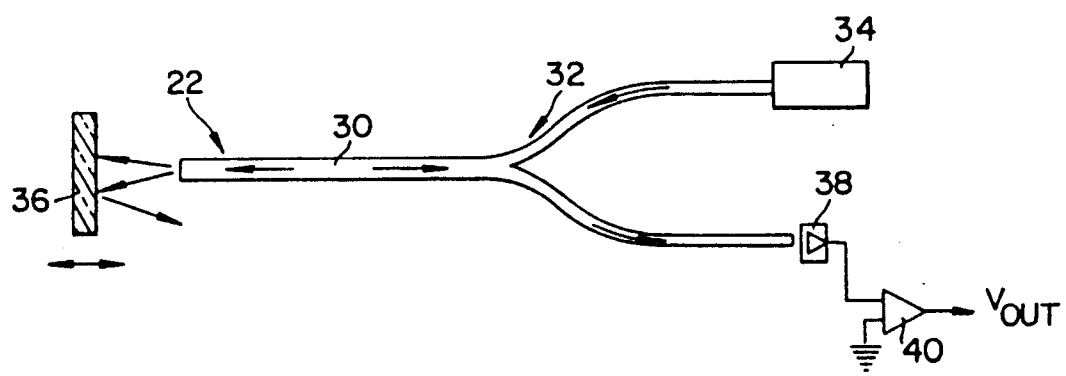
FIG. 2 is a schematic diagram of one embodiment of the optical fiber displacement sensor utilized by the present invention.

With respect to the displacement sensor 22, this sensor can take many different forms, the only requirement being that the sensor not contact the vibrating tube 24. One form for the sensor 22 is illustrated in FIG. 2 and includes a multimode optical fiber 30 utilizing a power divider, shown generally by the numeral 32, to interconnect a light-emitting diode or laser diode 34 light signal to a mirror 36 attached to the vibrating tube 24 and to transmit reflections from the mirror 36 to a silicon photodiode 38 that is interconnected to an operational amplifier 40 which provides an output signal. Operationally, continuous light from the light emitting diode or laser diode 34 is transmitted through the power divider 32 and the multimode optical fiber 30 to the mirror 36 mounted on the vibrating tube 24. Light reflections from the mirror 36 are transmitted through the multimode optical fiber 30 and the power divider 32 to the silicon photodiode 38 and amplified by the operational amplifier 40 attached thereto. As the mirror 36 moves away from the end of the multimode optical fiber 30, less light is reflected back into the fiber 30. Conversely, as the mirror 36 moves closer to the end of the multimode optical fiber 30, more light is transmitted back into the fiber 30. The result is an oscillating light intensity output at the tube vibration frequency which is converted into a current by the silicon photodiode 38 which, in turn, is transformed into an oscillating output voltage by operational amplifier 40. It has been found that motions down to $\pm 10$ $\mu$m can be detected by utilizing the foregoing multimode optical fiber approach.

Figure 3:
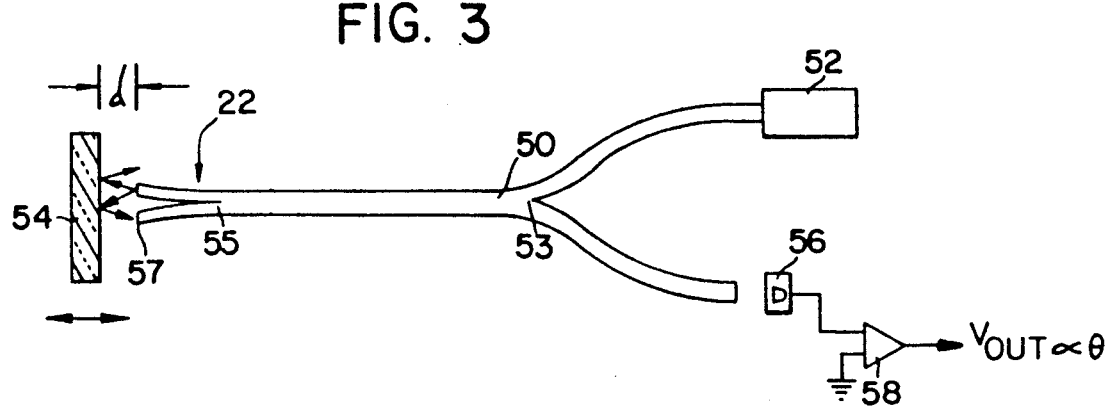
FIG. 3 is a schematic diagram of another embodiment of the optical fiber displacement sensor utilized by the present invention.

Another form of sensor 22 well known in the art is illustrated in FIG. 3 and includes a single mode optical fiber 50 which transmits continuous light from a laser diode 52 to a mirror 54 attached to the vibrating tube 24. The light from the laser diode 52 is coupled through a single mode power divider 53 to the mirror 54. A similar power divider 55 is located at the sensor end of the optical fiber 50, where the fibers are truncated near the end of the fused taper joint and polished. One of the fibers is coated with a reflective substance such as chrome to form a reflector 57. Light in this latter fiber provides the phase reference signal for this sensor. Light from the laser diode 52 is transmitted via the single mode optical fiber 50 to mirror 54 and reflector 57, and is reflected therefrom and transmitted by the optical fiber 50 to a silicon photodiode 56 whose output is connected to an operational amplifier 58. At the photodiode 56, the reflected light signal from mirror 54 and the reference light signal from reflector 57 interfere producing an output voltage that is proportional to the phase difference therebetween. Since the reflected light signal and the reference light signal are transmitted through the same optical fiber 50 and experience identical phase shifts except at the mirror 54 where light from the fiber 50 is allowed to be transmitted to and reflected from the mirror 54, the output voltage from the silicon photodiode 56 oscillates at a frequency representative of the vibrating tube 24 and thus of the phase difference therebetween and in accordance with the following equation:

$$\theta(t) = (2\pi\lambda)nd(t) \tag{3}$$

where n is the refractive index of air and d is the separation between the mirror 54 and the end of the optical fiber 50. It has been found that the optical fiber arrangement illustrated in FIG. 3 has much greater sensitivity ($\sim 1$ nm) than the light intensity method illustrated in FIG. 2.

From the foregoing, it is apparent that depending upon the type of optical fiber arrangement utilized for displacement sensor 22, measurements of changes in light intensity or measurements of changes in light phase can be effected. Typically, displacement sensors based on measuring changes in light intensity have better dc stability than sensors which measure changes in light phase, whereas the latter type of sensors provide greater sensitivity to small displacements. In any event, the present invention can be utilized with either type of sensor arrangement.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. A fiber optic transducer for measuring the pressure within a vessel, comprising:
   means for producing a first series of light pulses;
   means for converting said first series of light pulses into magnetic pulses;
   optical fiber means for transmitting said first series of light pulses from said light pulse producing means to said converting means;
   magnetic means operatively connected to the vessel whose pressure is being measured for converting said magnetic pulses applied thereto into periodic mechanical vibration of the vessel;
   means for producing a secondary light signal, said secondary light signal being directed toward and reflected from a reflective means attached to the vessel producing a modulated reflected secondary light signal proportional to said periodic mechanical vibration of the vessel, said producing means providing a reference light signal for producing a reflected reference light signal with a difference in phase between said reflected secondary light signal and the reflected reference light signal; and
   means for measuring said modulated reflected secondary light signal for determining the pressure within the vessel.

2. The transducer device as defined in claim 1 wherein said light pulse converting means comprises means for converting said first series of light pulses into current pulses and means for converting said current pulses into said magnetic pulses.

3. The transducer device as defined in claim 1 wherein said means for producing said secondary light signal produces an intensity modulated reflected light signal.

4. The transducer device as defined in claim 1 further including means for transmitting said secondary light signal toward said reflective means, and means for transmitting said reflected light signal from said reflective means.

5. The transducer device as defined in claim 4 wherein said transmitting means for said secondary light signal is an optical fiber.

6. The transducer device as defined in claim 4 wherein said transmitting means for said reflected light signal is an optical fiber.

7. The transducer device as defined in claim 4 wherein said transmitting means for said secondary light signal and said reflected light signal is a multimode optical fiber.

8. The transducer device as defined in claim 4 wherein said transmitting means for said secondary light signal and said reflected light signal is a single mode optical fiber.

9. The transducer device as defined in claim 1, further comprising means for sensing temperature of the vessel whose pressure is being measured, said temperature sensing means being in communication with said measuring means for compensating temperature dependent changes.

10. The transducer device as defined in claim 3, wherein said measuring means determines a frequency of light intensity modulation of said reflected secondary light signal.

11. The transducer device as defined in claim 1, wherein said measuring means determine a difference in phase between said reflected secondary light signal and said reflected reference light signal.

* * * * *